(12) United States Patent
Li

(10) Patent No.: US 7,830,827 B2
(45) Date of Patent: Nov. 9, 2010

(54) METHOD AND DEVICE OF HANDLING MULTI-USER/MULTI-SERVICE

(75) Inventor: Guangjie Li, Shanghai (CN)

(73) Assignee: Alcatel Lucent, Paris (FR)

( * ) Notice: Subject to any disclaimer, the term of this patent is extended or adjusted under 35 U.S.C. 154(b) by 1295 days.

(21) Appl. No.: 11/217,431

(22) Filed: Sep. 2, 2005

(65) Prior Publication Data

US 2006/0062247 A1 Mar. 23, 2006

(30) Foreign Application Priority Data

Sep. 20, 2004 (CN) .................. 2004 1 0066504

(51) Int. Cl.
*H04H 20/71* (2008.01)
(52) U.S. Cl. .................. 370/312; 370/349; 370/432
(58) Field of Classification Search .................. 370/338, 370/328, 473
See application file for complete search history.

(56) References Cited

U.S. PATENT DOCUMENTS

| | | | | |
|---|---|---|---|---|
| 6,084,888 | A * | 7/2000 | Watanabe et al. | 370/473 |
| 6,807,648 | B1 * | 10/2004 | Cansever et al. | 714/776 |
| 7,463,600 | B2 * | 12/2008 | Tong et al. | 370/314 |
| 2003/0169769 | A1 * | 9/2003 | Ho et al. | 370/473 |
| 2005/0034051 | A1 * | 2/2005 | Chun et al. | 714/795 |
| 2006/0056443 | A1 * | 3/2006 | Tao et al. | 370/462 |

FOREIGN PATENT DOCUMENTS

EP 0 944 275 A2 9/1999

OTHER PUBLICATIONS

J. Scott Ransbottom, "Mobile Wireless System Interworking with 3G and Packet Aggregation for Wireless LAN" Faculty of the Virginia Polytechnic Institute and State University, 'Online! Apr. 22, 2004, pp. 115-143, XP002363271.

* cited by examiner

*Primary Examiner*—Steven H Nguyen
*Assistant Examiner*—Alex Skripnikov
(74) *Attorney, Agent, or Firm*—Fay Sharpe LLP

(57) ABSTRACT

The present invention discloses a method of handling multi-user/multi-service in a wireless communication system comprising an access point, characterized in that the method includes the steps of: converging, by the access point, data packets of multi-user/multi-service and encapsulating the data packets of multi-user/multi-service into a container in the access point; coding and modulating, by the access point, the data encapsulated in the container; and mapping, by the access point, the coded and modulated data in the container to physical resources and emitting via a traffic channel the coded and modulated data in the container. According to the present invention, efficiency of a wireless communication system can be enhanced while delay can be reduced.

16 Claims, 4 Drawing Sheets

METHOD AND DEVICE OF HANDLING MULTI-USER/MULTI-SERVICE

CROSS-REFERENCE TO RELATED APPLICATION(S)

This application is based on the Chinese Patent Application No. 200410066504.X filed on Sep. 20, 2004, the disclosure of which is hereby incorporated by reference thereto in its entirety, and the priority of which is hereby claimed under 35 U.S.C. §119.

FIELD OF THE INVENTION

The present invention relates to wireless communication, and more particularly, to a method and device of handling multi-user/multi-service.

BACKGROUND OF THE INVENTION

With the progress of the times and technologies, there is a soaring demand for mobility and information. More and more people wish to have high speed access to the Internet during movement, acquire urgent information and thereby complete desired matters. Thus, it is an inexorable trend to integrate mobility with the Internet.

For future wireless communication, air interface should be an Internet Protocol (IP)-oriented air interface, all services are transmitted over IP, and seamless roaming and handover between various heterogeneous networks is supported.

All the existing wireless communication standards give full considerations when handling IP-based data services. For instance, wideband code division multiple access (WCDMA) provides shared channel to enable data packets of multiple users to be shared-transmitted over one identical channel. Some emerging wireless communication standards, such as 802.11 and 802.16, which are worked out by the Institute of Electrical and Electronic Engineers (IEEE), are designed out of consideration for the characteristics of data communication at the very start.

In essence, however, all these existing standards merely map IP layer transmission to wireless transmission by adapting without integrating IP features with characters of a wireless system. This will undoubtedly weaken the overall performance of the system. For instance, the transmission control protocol (TCP), which is highly sensitive to end-to-end delay, reduces the size of transmission window in case of large delay and thus impairs throughput. In wireless communication, a relatively long coding block is employed in order to obtain a larger coding gain, and a comparatively long interleaving block is employed in order to effectively resist time-selective fade. However, long coding block and long interleaving block will increase delay of data packets and finally affect the overall performance of the system. Such an effect is especially conspicuous when data packets are small.

In general, the existing methods of handling IP-based data in a wireless communication system can be summarized as follows: upon arrival, data packets are formed into a physical layer data unit with a fixed size through segmenting or assembling, after coding, interleaving at the physical layer and being mapped to physical resources, the unit is emitted on the wireless channel. Since only data packets of one service of one user can be transmitted each time, if a data packet is very small, then it needs to be filled with bits or wait for subsequent data packets. This wastes resources or increases delay.

SUMMARY OF THE INVENTION

It is an object of the present invention to overcome the problems pointed out above, enhance efficiency of a wireless communication system and reduce delay.

To achieve the aforesaid object, the present invention proposes a method of handling multi-user/multi-service in a wireless communication system comprising an access point, characterized in that the method includes the steps of: converging, by the access point, data packets of multi-user/multi-service and encapsulating the data packets of multi-user/multi-service into a container in the access point; coding and modulating, by the access point, the data encapsulated in the container; and mapping, by the access point, the coded and modulated data in the container to physical resources and emitting, via a traffic channel, the coded and modulated data in the container.

The present invention also proposes a method of handling multi-user/multi-service in a wireless communication system comprising a plurality of mobile terminals, characterized in that the method includes the steps of: receiving, by the plurality of mobile terminals, via a control channel, the coding and modulating schemes of data of multi-user/multi-service converged in a container, the number of users contained in the container, and the mapping relationship between the coded and modulated data in the container and physical resources; according to information obtained in the foregoing step, receiving, by the plurality of mobile terminals, via a traffic channel, data of multi-user/multi-service converged in the container comprising a container header carrying identifier information of multiple users and a container body carrying data packets of multiple users, recovering the container and decoding data in the container header; judging, by the plurality of mobile terminals, whether or not the container contains a data packet belonging thereto; and decoding, by the plurality of mobile terminals, the data packet in the container body of the container if finding that the container contains a data packet belonging thereto.

The present invention further proposes an access point comprises: converging means, for converging data packets of multi-user/multi-service, the converging means comprising a container for carrying data packets of multi-user/multi-service; coding and modulating means, for coding and modulating data carried in the container; and mapping means, for mapping the coded and modulated data in the container to physical resources.

The present invention further proposes a mobile terminal comprises: receiving means, for receiving, via a control channel, the coding and modulating schemes employed, the number of users contained in a container and the mapping relationship between the coded and modulated data and physical resources, and for receiving, via a traffic channel, data of multi-user/multi-service converged in the container comprising a container header carrying identifier information of multiple users and a container body carrying data packets of multiple users; recovering and first decoding means, for recovering the container and decoding data in the container header of the container, according to information received by the receiving means via the control channel and data of multi-user/multi-service converged in the container received by the receiving means via the traffic channel; judging means, for judging whether or not the container contains a data packet belonging thereto, in accordance with the decoding result of the data in the container header obtained by the recovering and first decoding means; and second decoding means, for decoding data in the container body to thereby obtain the data packet belonging thereto if judging that the container contains a data packet belonging thereto.

Preferably, data packets of multiple users, which have identical or like channel conditions, are encapsulated into an identical container in the access point.

Preferably, the access point broadcasts, via a control channel, the coding and modulating schemes employed, the number of users contained in the container, and the mapping relationship between the coded and modulated data in the container and physical resources.

Preferably, the wireless communication system is an orthogonal frequency division multiplexing wireless communication system.

According to the present invention, data packets of a user can be transmitted over non-equilong wireless channels, so that delay of processing and waiting can be reduced to a great extent.

BRIEF DESCRIPTION ON THE DRAWINGS

DESCRIPTION OF THE PREFERRED EMBODIMENTS

Hereinafter, the specific embodiments of the present invention will be described in detail.

Figure 1:
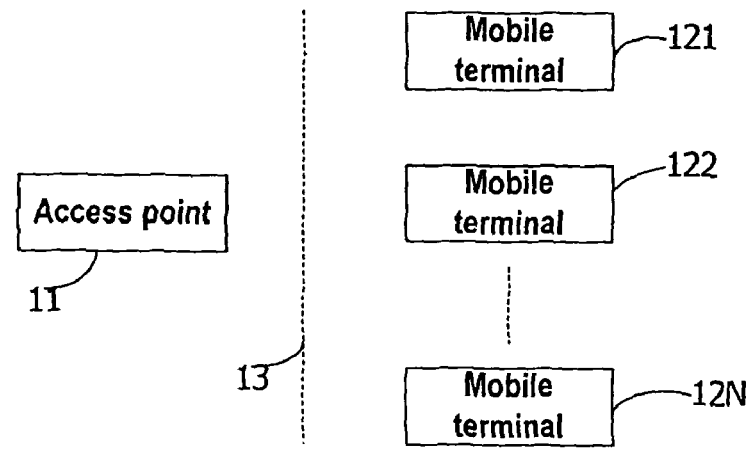
FIG. 1 is a schematic view showing a wireless communication system according to an embodiment of the present invention.

FIG. 1 is a schematic view showing a wireless communication system according to an embodiment of the present invention. As shown in this figure, the wireless communication system comprises an access point 11 and a plurality of mobile terminals 121, 122, . . . , 12N. The access point 11 communicates via air interface 13 with the plurality of mobile terminals 121, 122, . . . , 12N. Signaling messages are transmitted between the access point and the mobile terminals via a control channel, and data packets are transmitted via a traffic channel (not shown).

For the purpose of convenience, assuming that the relationship between users and mobile terminals is one-to-one correspondence, and the orthogonal frequency division multiplexing (OFDM) wireless communication system is taken as example for describing the specific embodiments of the present invention. Of course, those of ordinary skill in the art should understand that the present invention can also be applied in other types of wireless communication systems.

In order to reduce overhead, in the OFDM wireless communication system, OFDM resources are usually divided into sub-bands in terms of time and frequency, and one sub-band can be a cluster of subcarriers of one or several OFDM symbols.

According to an embodiment of the present invention, one slot consists of eight OFDM symbols, each of OFDM symbols has 1024 subcarriers. Each of OFDM symbols can have 895 subcarriers excluding some unavailable subcarriers. Among the eight OFDM symbols of one slot, 224 subcarriers are used for piloting, 230 subcarriers are used for the control channel, then actually assignable subcarriers are: 895×8−224−230=6706. Then, these subcarriers are divided into seven sub-bands, and subcarriers which each of the sub-bands occupies are: 6707÷7=958.

Figure 2:
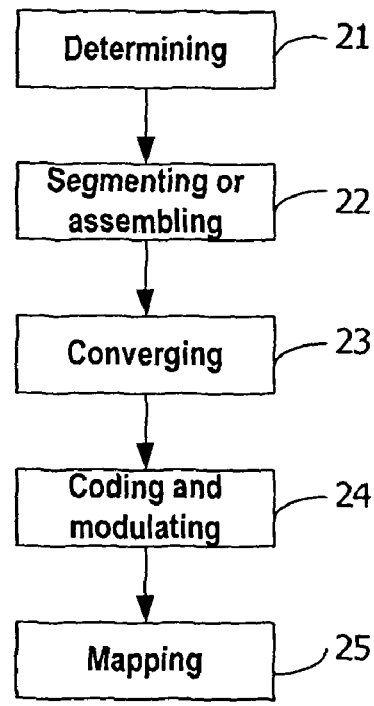
FIG. 2 is a flow chart showing the process of an access point handling multi-user/multi-service, according to an embodiment of the present invention.

FIG. 2 is a flow chart showing the process of the access point handling multi-user/multi-service, according to an embodiment of the present invention.

First, in step 21, the access point determines data packets of multi-user/multi-service to be transmitted to the plurality of mobile terminals. In some cases, the access point may refuse to transmit data packets of some users to mobile terminals. For instance, if a certain user fails to pass the authentication of the access point, then the access point refuses to access the data packets of this user.

After the access point determines the data packets of multi-user/multi-service to be transmitted to the plurality of mobile terminals, the flow goes to step 22. In this step, the access point segments or assembles the data packets of the same service of the same user. For instance, if a data packet of a certain user is too large and hence cannot be transmitted in one slot, the access point segments this data packet.

Upon completion of step 22, the flow goes to step 23. In this step, the access point converges data packets of multi-user/multi-service.

According to an embodiment of the present invention, the converged data packets of multi-user/multi-service are carried by containers.

According to an embodiment of the present invention, there can be 1-7 containers to carry the converged data packets of multi-user/multi-service in one slot, and the size of the container is integer times as large as the data the sub-band can transmit, i.e. as large as the data one sub-band can transmit at least, and as large as the data seven sub-bands can transmit at most. Each container can carry data packets of a plurality of different users, or data packets of multiple services of the same user, or data packets of a single user. Each container comprises two parts, namely a container header and a container body. The container header is used to carry users' identifier information and the container body is used to carry users' data packets.

Generally, data packets of plural users having similar or same channel conditions are carried in one identical container.

Figures 3, 4, 5:
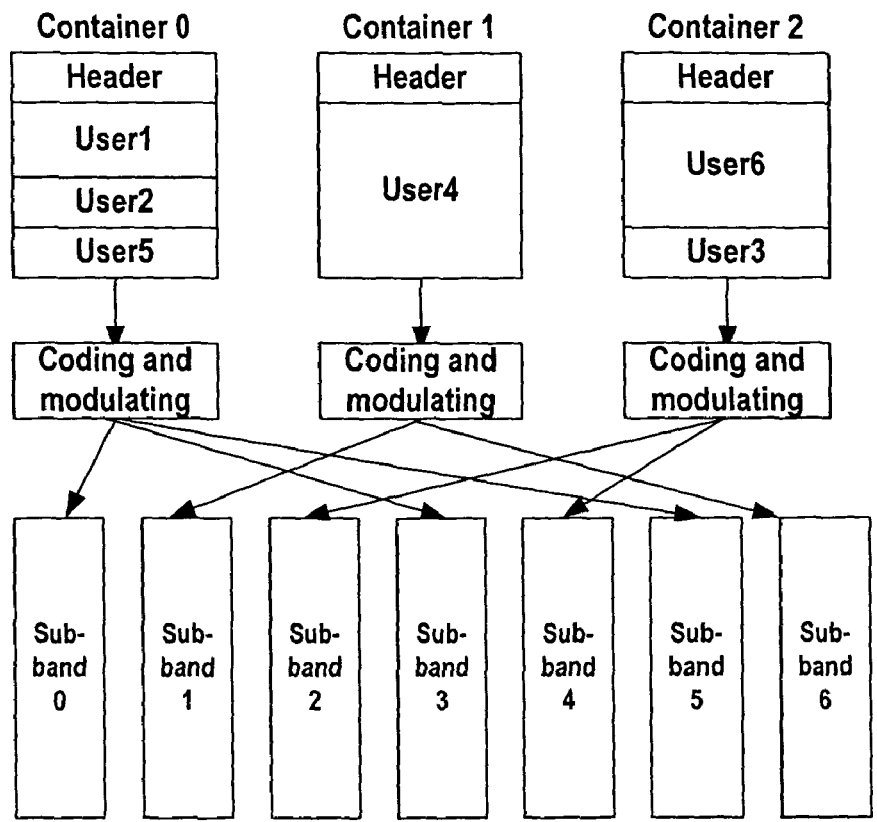
FIG. 3 is a schematic view showing the case in which a container carries data packets of a plurality of different users and in which containers are mapped to sub-bands, according to an embodiment of the present invention.
FIG. 4 is a schematic view showing a container which contains data packets of four users.
FIG. 5 is a schematic view showing an ordinary data packet.

According to an embodiment of the present invention, data packets of six users need to be transmitted in one slot, which are carried by three containers. As shown in FIG. 3, container 0 carries data packets of users 1, 2 and 5; container 1 carries data packets of user 4; and container 3 carries data packets of users 3 and 6.

According to an embodiment of the present invention, the size of the container is fixed, that is, as large as the data one sub-band can transmit, e.g. the data 958 subcarriers can transmit. In one container, it can accommodate a maximum of data packets of eight users, or data packets of eight types of service. The size of the container header of the container varies with the number of data packets of users. That is, for a container that can accommodate a maximum of data packets of eight users, its container header has eight different sizes. The container header contains only user's identifier (ID) information, which is defined by six bits, and cyclic redundancy check (CRC) code. When the ID of a user corresponding to a data packet is 000000, all users are required to receive this data packet, i.e., ID=000000 corresponds to a broadcast address. In general, when a broadcast address is employed in a container, the channel conditions of each user should be taken into consideration, and the sub-bands all users having fine channel conditions should be selected.

The boundary of data packets between users should be marked at the start part of the container body. According to an embodiment of the present invention, boundary information is defined by 9 bits. Users' data packets are laced in the remaining part of the container body in order. Usually, data packets of different types have different formats.

FIG. 4 is a schematic view showing a container that contains data packets of four users. As shown in this figure, the container header comprises the ID of the first user, the ID of the second user, the ID of the third user, the ID of the fourth user and CRC information. The container body comprises a first boundary information, a second boundary information, a third boundary information, data packet of the first user, data packet of the second user, data packet of the third user and data packet of the fourth user.

According to another embodiment of the present invention, user data packets inside the container body are divided into two categories, which are differentiated by the first bit within data area. This bit is called Type in order to facilitate description. One of the two categories is ordinary data packet defined by Type =0; the other is special data packet defined by Type =1.

FIG. 5 is a schematic view showing an ordinary data packet. As shown in this figure, this data packet comprises the following fields: a Type field, whose value equals 0; a service identifier field, which is usually 8 bits; a serial number field, the number of bits of this field depends on concrete conditions; a data packet field, in which the data packet to be transmitted is contained; and a CRC field.

When Type =1, the data packet is a special data packet. According to an embodiment of the present invention, three special data packets are proposed, the concrete meaning of each of which is determined by the Protocol field which consists of three bits and which follows the Type field.

For instance, when Protocol =001, the special data packet is defined as a control packet for transmitting control information from the access point to the mobile terminal, for example, reminding the mobile terminal of the source address, port number and other information corresponding to a certain service. In other words, the control packet is equivalent to a user-dedicated control channel, or is equivalent to a broadcast control channel in the case that the broadcast address is used.

When Protocol =011, the special data packet is defined as a segmentation packet. When a data packet is too large to be transmitted in one container, the data packet needs to be segmented into several packets, which are transmitted in segmentation packets. Typically, the segmentation packet has the structure of the ordinary packet except one more sub-serial number field for indicating specifically which data packet it is after segmenting. Moreover, the first sub-packet should contain information of the length of the data packet prior to the segmentation.

When Protocol =010, the special data packet is defined as a re-transmission packet for transmitting a re-transmission data packet which may be a whole data packet or one of segmentation packets.

Of course, those skilled in the art should understand that the above definition is merely illustrative and other special data packets can also be defined according to needs.

Referring to FIG. 2 again, after the access point converges users' data packets, the flow goes to step 24. In this step, data contained in the container header and the container body is coded and modulated.

According to an embodiment of the present invention, since information contained in the container header, which is equivalent to channel associated signaling, is of vital importance, different coding is performed on data contained in the container header and data contained in the container body. For the data in the container header, a coding scheme with strong error-correcting capability is applied so as to reduce the probability of error occurrence to a minimum; as for the data in the container body, an appropriate coding scheme is selected according to needs. For instance, when the data packet contained in a certain container body is of great significance, a coding scheme with strong error-correcting capability is adopted; when the data packet in the container body is less important, a coding scheme with a little weak error-correcting capability is adopted so as to enhance efficiency.

The coded data in the container header and the container body may be modulated using binary phase shift key (BPSK), quadrature phase shift key (QPSK), 16-quadrature amplitude modulation (16QAM), 64-quadrature amplitude modulation (64QAM) and other modulation schemes.

Upon completion of the step of coding and modulating, the flow goes to step 25. In this step, the coded and modulated data in the container is mapped to physical resources, i.e. sub-bands.

According to an embodiment of the present invention, data in the container 0 is mapped to sub-bands 0, 3 and 5; data in the container 1 is mapped to sub-bands 1 and 6; and data in the container 2 is mapped to sub-bands 2 and 4, just as shown in FIG. 3. Of course, those skilled in the art should understand that the above mapping is merely illustrative.

Through the above steps, the access point can send data packets of different users or different services together to each mobile terminal via the wireless traffic channel.

In order to enable each mobile terminal to correctly receive the data packets belonging thereto, at every slot, the access point broadcasts, via the control channel, to each mobile terminal the mapping conditions of data in each container to the sub-bands, the modulating and coding schemes of data in each container, the number of users contained in each container and other information.

Figure 6:
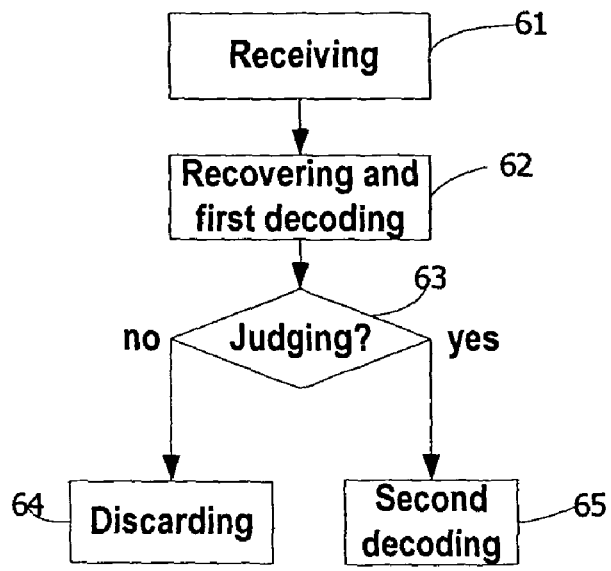
FIG. 6 is a flow chart showing the process of a mobile terminal handling multi-user/multi-service, according to an embodiment of the present invention.

FIG. 6 is a flow chart showing the process of a mobile terminal handling multi-user/multi-service, according to an embodiment of the present invention.

First, in step 61, the mobile terminal obtains via the control channel the mapping conditions of data in each container to the sub-bands, the modulating and coding schemes of data in each container, the number of users contained in each container, etc.

Then, the flow goes to step 62. In this step, according to the information obtained in step 61, the mobile terminal gets via the traffic channel data packets of multiple users contained in each container, which are sent by the access point, recovers each container and decodes data contained in the container headers of each container.

Next, the flow goes to step 63. In this step, the mobile terminal judges in accordance with the decoded data in the container header whether the container contains a data packet belonging thereto. If the container does not contain a data packet belonging to the mobile terminal, the flow goes to step 64. Otherwise, the flow goes to step 65.

In step 64, the mobile terminal discards the data packet contained in the container.

In step 65, the mobile terminal decodes data in the container body and thus obtains a data packet belonging thereto.

Figure 7:
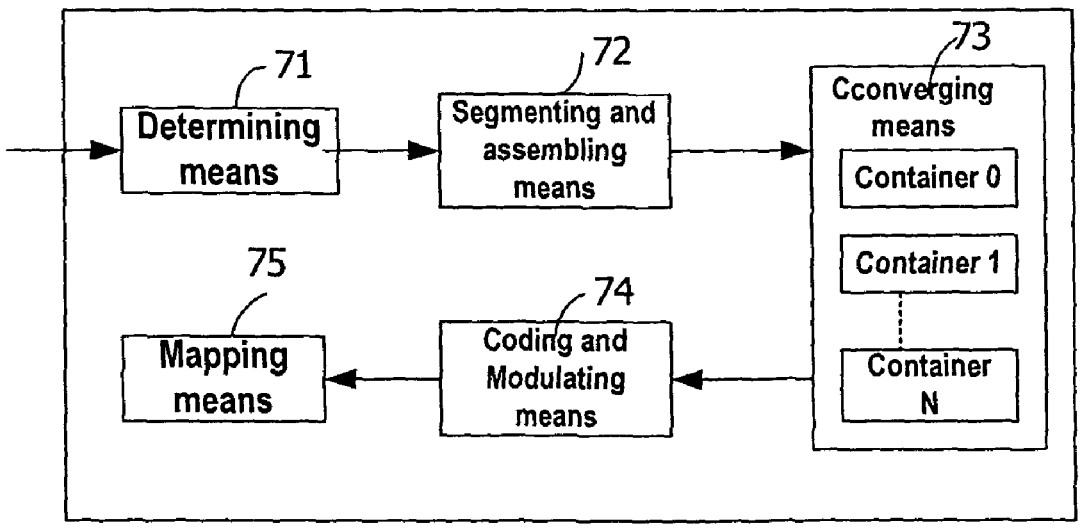
FIG. 7 is a schematic view showing a block diagram of an access point according to an embodiment of the present invention.

FIG. 7 is a schematic view showing a block diagram of an access point according to an embodiment of the present invention.

As shown in the figure, the access point according to the present invention comprises: determining means 71, for determining data packets of multi-user/multi-service to be transmitted to the mobile terminals; segmenting and assembling means 72, for segmenting or assembling data packets of the same service of the same user, which pass through the determining means 71; converging means 73, for converging data packets of multi-user/multi-service, which pass through the segmenting and assembling means 72; coding and modulating means 74, for coding and modulating data packets of multi-user/multi-service, which pass through the converging means 73; and mapping means 75, for mapping the coded and modulated data packets to physical resources.

Among them, the converging means comprises a plurality of containers for carrying data packets of multi-user/multi-service. Each container includes a container header and a container body. The container header is used to carry users' identifier information and the container body is used to carry data packets of multi-user.

Figure 8:
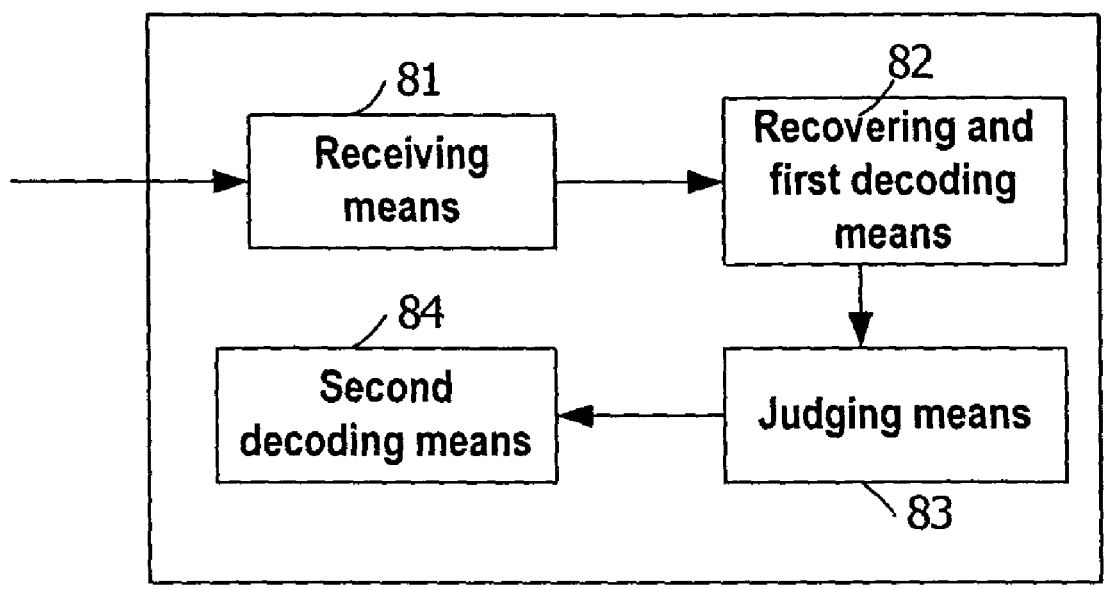
FIG. 8 is a schematic view showing a bock diagram of a mobile terminal according to an embodiment of the present invention.

FIG. 8 is a schematic view showing a block diagram of a mobile terminal according to an embodiment of the present invention.

As shown in the figure, the mobile terminal according to the present invention comprises: receiving means 81, for receiving via a control channel the mapping conditions of data in containers to the sub-bands, the coding and modulating schemes of data in each container, the number of users contained in each container and other information sent from the access point, and for receiving via the traffic channel data packets of multi-user, which are contained in each container and sent from the access point; recovering and first decoding means 82, for, according to the information received by the receiving means 81, recovering each container and decoding data in the container headers of each container; judging means 83, for, according to the decoding result of data in the container header by the recovering and first decoding means 82, judging whether or not a container contains a data packet belonging thereto; and second decoding means 84, for decoding data in the container body, thereby obtaining the data packet belonging thereto.

Various changes and alternations can be made without departing from the concept and scope of the present invention. It should be understood that the present invention is not limited to the specific embodiments, and the scope thereof is defined by the claims as appended.

What is claimed is:

1. A method of handling multi-user/multi-service in a wireless communication system comprising an access point, the method comprising:

converging, by the access point, data packets of multi-user/multi-service and encapsulating the data packets of multi-user/multi-service into a container in the access point, the container comprising a container header and a container body;

coding and modulating, by the access point, the data encapsulated in the container, wherein different coding is performed on data in the container header and data in the container body;

mapping, by the access point, the coded and modulated data in the container to physical resources and emitting via a traffic channel the coded and modulated data in the container; and broadcasting, by the access point, via a control channel, the coding and modulating schemes employed, the number of users contained in the container, and the mapping relationship between the coded and modulated data in the container and physical resources;

wherein different coding is performed on different data packets in the container body.

2. The method of claim 1, wherein coding the data in the container header is performed using a coding scheme having stronger error-correcting capability than a coding scheme used in coding the data in the container body.

3. The method of claim 1, wherein the container comprises a container header for carrying identifier information of multiple users, and a container body for carrying data packets of multiple users.

4. The method of claim 1, wherein data packets of multiple users, which have identical or like channel conditions, are encapsulated into an identical container in the access point.

5. The method of claim 1, wherein the wireless communication system is an orthogonal frequency division multiplexing wireless communication (OFDM) system.

6. The method of claim 1, wherein user data packets inside the container body are divided into two categories, wherein one category defines the data packet as being an ordinary data packet and the other category defines the data packet as being a special data packet.

7. The method of claim 6, wherein the special data packet is defined as one of a control packet for transmitting control information from the access point to the mobile terminal, a segmentation packet, and a re-transmission packet for re-transmitting a data packet or one of segmentation packets.

8. The method of claim 7, wherein the kind of special data package is indicated by a protocol field, and wherein the protocol field is located in the user data packet that is placed in the container body.

9. A method of handling multi-user/multi-service in a wireless communication system comprising a plurality of mobile terminals, the method comprising:

receiving, by the plurality of mobile terminals, via a control channel, the coding and modulating schemes of data of multi-user/multi-service converged in a container, the number of users contained in the container, and the mapping relationship between the coded and modulated data in the container and physical resources, the received coding schemes including different coding schemes for a header and a body of the container;

according to information obtained in the foregoing step, receiving, by the plurality of mobile terminals, via a traffic channel, data of multi-user/multi-service converged in the container comprising a container header carrying identifier information of multiple users and a container body carrying data packets of multiple users, recovering the container and decoding data in the container header;

judging, by the plurality of mobile terminals, whether or not the container contains a data packet belonging thereto; and decoding, by the plurality of mobile terminals, data in the container body of the container if finding that the container contains a data packet belonging thereto;

wherein decoding the data in the container body comprises decoding different data packets of the container body using different decoding schemes.

10. The method of claim 9, wherein the data in the container header is coded using a coding scheme having stronger error-correcting capability than a coding scheme used in decoding the data in the container body.

11. An access point, comprising:

converging means for converging data packets of multi-user/multi-service, the converging means comprising a container with a container header and a container body for carrying data packets of multi-user/multi-service;

coding and modulating means for coding and modulating data carried in the container using different coding schemes for the container header and the container body;

mapping means for mapping the coded and modulated data in the container to physical resources;

emitting means for emitting via a traffic channel the coded and modulated data in the container; and means for broadcasting via a control channel, the coding and modulating schemes employed, the number of users contained in the container, and the mapping relationship between the coded and modulated data in the container and physical resources;

wherein the coding and modulating means performs different coding on different data packets in the container body.

12. The access point of claim 11, wherein the container comprises a container header for carrying identifier information of multiple users, and a container body for carrying data packets of multiple users.

13. The access point of claim 11, wherein user data packets inside the container body are divided into two categories, wherein one category defines the data packet as being an ordinary data packet and the other category defines the data packet as being a special data packet.

14. The access point of claim 11, wherein the special data packet is defined as one of a control packet for transmitting control information from the access point to the mobile terminal, a segmentation packet, and a re-transmission packet for re-transmitting a data packet or one of segmentation packets.

15. The access point of claim 11, wherein the kind of special data package is indicated by a protocol field, wherein the protocol field is located in the user data packet that is placed in the container body.

16. A mobile terminal, comprising:

receiving means for receiving, via a control channel, coding and modulating schemes employed, the number of users contained in a container that includes coded and modulated data in a container header and a container body and a mapping relationship between the coded and modulated data and physical resources, and for receiving, via a traffic channel, data of multi-user/multi-service converged in the container comprising the container header carrying identifier information of multiple users and the container body carrying data packets of multiple users, the received coding schemes including different coding schemes for the container header and the container body;

recovering and first decoding means, for recovering the container and decoding data in the container header of the container, according to information received by the receiving means via the control channel and data of multi-user/multi-service converged in the container received by the receiving means via the traffic channel;

judging means for judging whether or not the container contains a data packet belonging thereto, in accordance with the decoding result of the data in the container header obtained by the recovering and first decoding means; and second decoding means, for decoding data in the container body according to the received coding schemes received by the receiving means via the control channel to thereby obtain the data packet belonging thereto if judging that the container contains a data packet belonging thereto;

wherein the second decoding means performs different decoding on different data packets in the container body.

* * * * *